United States Patent [19]

Evers et al.

[11] 3,922,288

[45] Nov. 25, 1975

[54] PROCESSES FOR PRODUCING 3-THIA FURANS AND 3-FURAN THIOLS

[75] Inventors: William J. Evers, Atlantic Highlands; Howard R. Heinsohn, Jr., Hazlet; Bernard J. Mayers, Cliffwood Beach, all of N.J.

[73] Assignee: International Flavors & Fragrances Inc., New York, N.Y.

[22] Filed: June 11, 1974

[21] Appl. No.: 478,368

Related U.S. Application Data

[63] Continuation-in-part of Ser. No. 386,450, Aug. 7, 1973, abandoned.

[52] U.S. Cl. .............................. 260/347.2; 426/65
[51] Int. Cl.² ....................................... C07D 307/64
[58] Field of Search ................................ 260/347.2

[56] References Cited
OTHER PUBLICATIONS
Bailey et al., J. Org. Chem., Vol. 21, p. 709–710 (1956).

*Primary Examiner*—Harry I. Moatz
*Attorney, Agent, or Firm*—Arthur L. Liberman, Esq.; Harold Haidt, Esq.

[57] ABSTRACT

Processes for producing substituted or unsubstituted 3-thia furans and 3-furan thiols comprising the steps of:

i. Providing a 2-ene-1,4 dione having the structure:

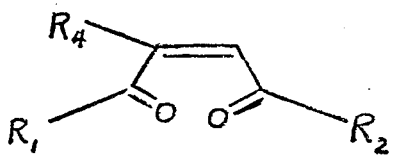

ii. Intimately admixing said 2-ene-1,4 dione with a thiol having the formula $R_3SH$ thereby providing a substituted or unsubstituted 2-thia substituted 1,4 dione having the structure:

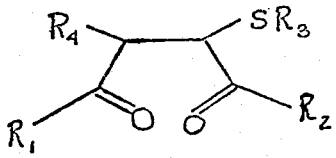

iii. Cyclizing said 2-thia substituted 1,4 dione to form a substituted or unsubstituted 3-thia furan having the formula:

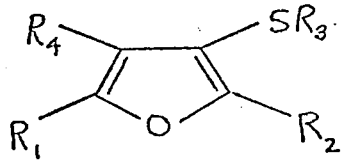

iv. Optionally but only when $R_3$ hydrolyzing is acyl or aroyl, said 3-thia furan thereby forming a 3-mercapto furan having the structure:

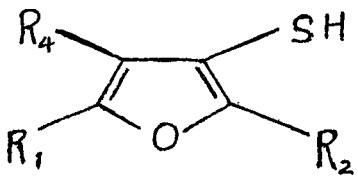

v. Optionally, reacting said 3-mercapto furan with an acyl halide thereby forming a 3-thia furan having the formula:

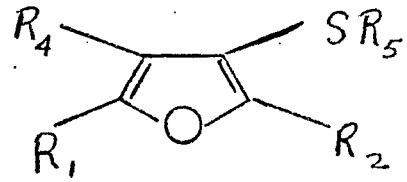

wherein $R_1$ and $R_2$ are the same or different lower alkyl; wherein $R_3$ is either acyl, aroyl, or alkyl; wherein $R_4$ is hydrogen or lower alkyl; and wherein $R_5$ is different from $R_3$ and is either acyl or aroyl. If either of $R_1$ or $R_2$ are hydrogen, then step (ii) is performed in the presence of an organic base such as piperidine, pyridine, triethyl amine, quinoline, or α-picoline.

13 Claims, No Drawings

PROCESSES FOR PRODUCING 3-THIA FURANS AND 3-FURAN THIOLS

This application is a continuation-in-part of application for U.S. Pat. No. 386,450 filed on Aug. 7, 1973, now abandoned.

BACKGROUND OF THE INVENTION

The present invention relates to novel processes for producing 3-thia furans and 3-mercapto furans.

Artificial flavoring agents for foodstuffs have received increasing attention in recent years. In many areas, such food attention agents are preferred over natural flavoring agents at least in part because of the uniform flavor that may be so obtained. For example, natural food flavoring agents such as extracts, essences, concentrates and the like are often subject to wide variation due to changes in the quality, type and treatment of the raw materials. Such variation can be reflected in the end product and results in unreliable flavor characteristics and uncertainity as to consumer acceptance and cost. Additionally the presence of the natural product in the ultimate food may be undesirable because of increased tendency to spoil. This is particularly troublesome in convenience and snack food usage where such products as dips, soups, chips, prepared dinners, canned foods, sauces, gravies and the like are apt to be stored by the consumer for some time prior to use.

The fundamental problem in preparing artificial flavoring agents is that of achieving as nearly as possible a true flavor reproduction. This generally proves to be a difficult task since the magnetism for flavor development in many foods is not understood. This is noteable in products having meaty and roasted flavor characteristics. It is also noteable in products having vegetable-like and hydrolyzed vegetable protein-like and anise-like flavor characteristics.

Reproduction of roasted and meat flavors and aromas and vegetable-like and hydrolyzed vegetable protein-like and anise-like flavors and aromas has been the subject of the long and continuing search by those engaged in the production of foodstuffs. The severe shortage of foods, especially protein foods, in many parts of the world has given rise to the need for utilizing non-meat sources of proteins and making such proteins as palatable and as meat-like as possible. Hence, materials which will closely simulate or exactly reproduce the flavor and aroma of roasted meat products and liver products and vegetable products are required.

Moreover, there are a great many meat containing or meat based foods presently distributed in a preserved form. Examples being condensed soups, dry-soup mixes, dry meat, freeze-dried or lyophilized meats, packages gravies and the like. While these products contain meat or meat extracts, the fragrance, taste and other organoleptic factors are very often impaired by the processing operation and it is desirable to supplement or enhance the flavors of these preserved foods with versatile materials which have either roasted meat or gravy-like or vegetable-like or meat-like or ham-like nuances.

U.S. Pat. No. 3,666,495 provided materials having such desirable meat, roast meat and roasted fragrance and flavor notes. Such materials are organic oxygen containing heterocyclics wherein the second carbon atom from the oxygen atom contains a sulfur substituent and included 3-thia furan compounds having the structure:

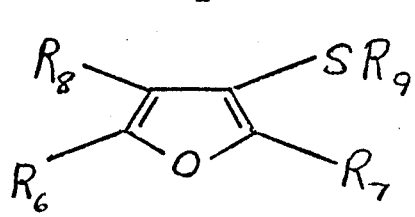

wherein $R_6$, $R_7$, $R_8$ and $R_9$ are the same or different alkyl or hydrogen. The process disclosed in this patent indicated that such furan 3-thiols and alkyl substituted furan 3-thiols can be produced by the reaction of an appropriate dihydro furanone-3 or tetrahydro furanone-3 with hydrogen sulfide in the presence of anhydrous hydrogen chloride at temperatures of $-60°C$ to $-100°C$. It was further indicated that the reaction yielded mixtures of furan-3-thiols and dihydro furan-3-thiols which had to be separated. Although such reaction as was disclosed in U.S. Pat. No. 3,666,495 provided reasonable yields of furan-3-thiols the disclosed processes were both (a) expensive from a commercial standpoint and (b) relatively difficult to control from a chemistry standpoint.

Although each individual step is separately shown in the prior art, the combination of the steps leading to the 3-thia furans or 3-mercapto furans is not shown. Thus, Traynelis et al., J. Org. Chem. 29,126 discloses cyclization of a 1,4-diketone to form a furan. Swiss Patent 531,313 discloses the addition of hydrogen sulfide across a double bond, eliminating the double bond. Such a reaction, however, is not shown in conjunction with a chemical compound which has 2-keto moieties. The mechanism of the addition of hydrogen sulfide across a double bond of an $\alpha,\beta$-unsaturated ketone is set forth at lines 40–67 of columns 3 and 4 of Swiss Patent 531,559. Hydrolysis of a thia ester to a thiol is set forth at page 446 of chapter 36 of "Organic Sulfur Compounds" Volumn 1, Editor: N. Kharash, Pergamon Press 1961 London. The formation of thia esters using thia acetic acid and unsaturated ketones is set forth at lines 15–20 of column 6 of Swiss Pat. No. 531,559.

THE INVENTION

The processes of the present invention provide straight forward methods for producing 3-thia furans and 3-mercapto furans in good yields in an economical manner.

Briefly, the processes of our invention comprise the steps of:

i. Providing a 2-ene-1,4dione having the structure:

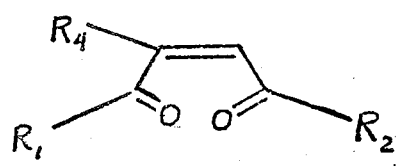

ii. Intimately admixing said 2-ene-1,4 dione with a thiol having the formula $R_3SH$ thereby providing a substituted or unsubstituted 2-thia substituted 1,4 dione having the structure:

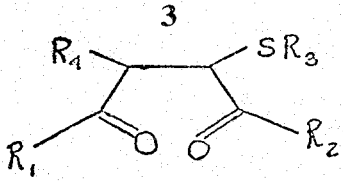

iii. Cyclizing said 2-thia substituted 1,4 dione to form a substituted or unsubstituted 3-thia furan having the formula:

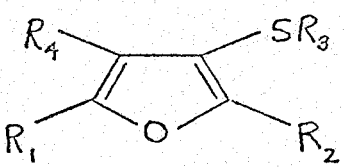

iv. Optionally but only when $R_3$ is acyl or aroyl, hydrolyzing said 3-thia furan to form a 3-mercapto furan having the structure:

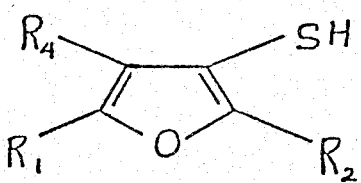

v. Optionally, reacting the thus formed 3-mercapto furan thus forming a new acyl or aroyl 3-thia furan having the structure:

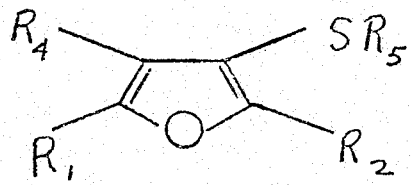

wherein $R_1$ and $R_2$ are the same or different alkyl; wherein $R_3$ is either acyl, aroyl or alkyl; wherein $R_4$ is hydrogen or lower alkyl; and wherein $R_5$ is different from $R_3$ and is either acyl or aroyl. $R_1$ or/and $R_2$ may each be hydrogen in the event that in step (ii) the 2-ene-1,4 dione is admixed with the thiol having the formula $R_3SH$ in the presence of an organic base such as piperidine, pyridine, triethyl amine, quinoline or α-picoline or a mixture thereof.

The 2-ene-1,4 dione may be prepared by reacting 2,5-dialkoxy-2,5 dialkyl-2,5-dihydrofuran with a weak acid hydrolysis agent such as 1% aqueous acetic acid under reflux conditions. The resulting material will be in the case of starting with 2,5-dimethoxy-2,5-dimethyl-2,5-dihydrofuran, cis-3-hexen-2,5-dione.

The resulting 2-ene-1,4 dione is then reacted with a thiol having the formula $R_3SH$ wherein $R_3$ is either acyl, aroyl or alkyl. Examples of such thiols are:

Thioacetic acid
Thiopropionic acid
Thiobutyric acid
Thioisobutyric acid
Thio-n-pentenoic acid
Methyl mercaptan
Ethyl mercaptan
n-Propyl mercaptan
Isopropyl mercaptan
n-Butyl mercaptan
Isobutyl mercaptan
n-Hexyl Mercaptan
n-Octyl Mercaptan
n-Nonyl Mercaptan
Benzyl Mercaptan
Thiophenol
p-tolyl Mercaptan
m-tolyl Mercaptan
o-tolyl Mercaptan
Thiocinnamic Acid
Thiobenzoic Acid
2-Methyl Thiobenzoic Acid
3-Methyl Thiobenzoic Acid
4-Methyl Thiobenzoic Acid
2,4-Dimethyl-Thiobenzoic Acid
3,5-Dimethyl-Thiobenzoic Acid Whether an organic base is used or not in the reaction with the 2-ene-1,4 dione with the thiol having the formula $R_3SH$, the 2-ene-1,4 dione can be exemplified as follows:

| Compound Name | $R_1$ | $R_2$ | $R_4$ |
| --- | --- | --- | --- |
| 3-Hexen-2,5-dione | Methyl | Methyl | Hydrogen |
| 3-Methyl-3-hexen-2,5 dione | Methyl | Methyl | Methyl |
| 3-Methyl-3-hepten-2,5 dione | Methyl | Ethyl | Methyl |
| 3-Ethyl-3-hepten-2,5 dione | Methyl | Ethyl | Ethyl |
| 4-Ethyl-4-octen-3,6 dione | Ethyl | Ethyl | Ethyl |
| 3-Propyl-3-hepten-2,5 dione | Methyl | Ethyl | Propyl |
| 4-Methyl-3-hepten-2,5 dione | Ethyl | Methyl | Methyl |
| 4-Methyl-4-octen-3,6 dione | Ethyl | Ethyl | Methyl |
| 4-Methyl-4-nonen-3,6 dione | Ethyl | Propyl | Methyl |
| 4-Propyl-3-hepten-3,6 dione | Ethyl | Methyl | Propyl |
| 5-Methyl-5-decene-4,7 dione | Propyl | Propyl | Methyl |
| 5-Methyl-4-nonen-3,6 dione | Propyl | Ethyl | Methyl |
| 4-Methyl-3-nonen-2,5 dione | Butyl | Methyl | Methyl |
| 4-Ethyl-3-nonen-2,5 dione | Butyl | Methyl | Ethyl |
| 3-Methyl-3-nonen-2,5 dione | Methyl | Butyl | Methyl |
| 3-Propyl-3-nonen-2,5 dione | Methyl | Butyl | Propyl |
| 3-Butyl-3-hexen-2,5 dione | Methyl | Methyl | Butyl |
| 4-Octen-3,6-dione | Ethyl | Ethyl | Hydrogen |

As stated above, $R_1$ and $R_2$ can each be hydrogen for the purposes of these processes of our invention in the event that in the reaction of the 2-ene-1,4 dione with the thiol of the formula $R_3SH$, an organic base is used. Hence, in addition to the foregoing compounds, the following compounds can be utilized in the reaction with $R_3SH$:

| Compound Name | $R_1$ | $R_2$ | $R_4$ |
| --- | --- | --- | --- |
| 2-Buten-1,4 dial | Hydrogen | Hydrogen | Hydrogen |
| 2-Methyl-2-Buten-1,4 dial | Hydrogen | Hydrogen | Methyl |
| 2-Pentenal-4-one | Methyl | Hydrogen | Hydrogen |
| 2-Hexenal-4-one | Ethyl | Hydrogen | Hydrogen |
| 3-Methyl-2-Hexenal-4-one | Ethyl | Hydrogen | Methyl |
| 2-Methyl-2-pentenal-4-one | Hydrogen | Methyl | Hydrogen |
| 2-Methyl-2-heptenal-4-one | Hydrogen | Propyl | Methyl |
| 2-Methyl-2-octenal-4-one | Hydrogen | Butyl | Methyl |

Examples of useful organic bases are piperidine, pyridine, quinoline, triethyl amine and α-picoline. In place of such organic bases, radical initiators may be used such as benzoyl peroxide or azobisisobutyl nitrile. The reaction may be is carried out in a solvent such as water or an ether such as diethyl ether or a hydrocarbon such as benzene or hexane or cyclohexane. The reaction may also be carried out without the use of a solvent. The reaction may be is carried out under reflux conditions although temperatures varying from 0° up to 60°C are suitable and will give rise to commercially suitable yields. Where the reaction is carried out with highly volatile reactants, e.g., methyl mercaptan, higher pressures than atmospheric pressure are preferred, e.g., three atmospheres pressure. Examples of reaction products, 2-thia-substituted-1,4-diones which are formed from the reaction of the 2-ene-1,4 diones with the thiols having the formula $R_3SH$ are as follows:

adds a slight sulphury note to beef bouillion. 3-Thioacetyl-2,5-hexane dione at 5 ppm adds a burnt meat note to beef bouillion. 3-Thiobenzoyl-2,5-hexane dione adds a slightly green chicken meat note to chicken broth at 2.5 ppm. 3-Thioacetyl-2,5-hexane dione adds eggy chicken notes to chicken broth at 2.5 ppm. 3-Mercapto-2,5-hexane dione adds a chicken sulphury note to chicken broth at 2.5 ppm.

When used as intermediates, the foregoing 2-thia substituted 1,4-diones are cyclized to form substituted or unsubstituted 3-thiafurans according to the following reaction:

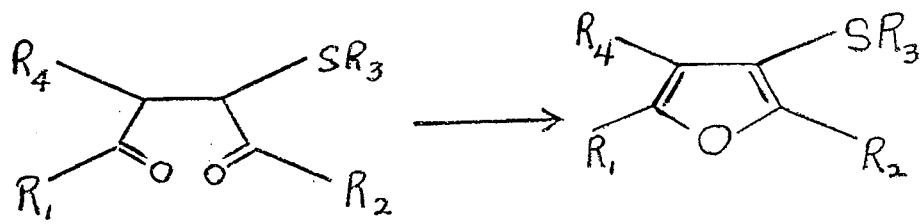

wherein $R_1$ and $R_2$ are the same or different and are each hydrogen or lower alkyl; wherein $R_3$ is either hydrogen, acyl, aroyl or alkyl and $R_4$ is hydrogen or lower alkyl. The resulting 3-thiafurans may be used as such for their organoleptic properties or they may be hydrolyzed and then reacylated or rearoylated to form other

| 2-ene-1,4 dione Reactant | $R_3SH$ Thiol Reactant | 2-thia Substituted 1,4-dione Reaction Product |
| --- | --- | --- |
| 3-Hexen-2,5 dione | Thioacetic acid | 3-thioacetyl-2,5-hexane dione |
| 3-Methyl-3-Hexen-2,5 dione | Thiopropionic acid | 3-thiopropionyl-4-methyl hexane-2,5-dione |
| 3-Methyl-3-heptene-2,5 dione | Thiobenzoic acid | 4-thiobenzoyl-4-methyl heptane-3,6-dione |
| 3-Ethyl-3-heptene-2,5 dione | Thiobenzoic Acid | 4-thiobenzoyl-5-ethyl heptane-3,6-dione |
| 4-Ethyl-4-octene-3,6-dione | Thioacetic acid | 4-thioacetyl-5-ethyl octane-3,6 dione |
| 3-Propyl-3-heptene-2,5 dione | Butyl Mercaptan | 4-Butylthio-5-propyl heptane-3,6-dione |
| 4-Methyl-3-heptene-2,5-dione | o-tolyl Mercaptan | 3(o-tolyl thio)-4-methyl heptane-2,5-dione |
| 2-Buten-1,4-dial | Thioacetic acid | 2-thioacetyl-butan-1,4-dial |
| 2-Methyl-2-buten-1,4-dial | Butyl Mercaptan | 2-butyl thio-3-methyl butan-1,4-dial |
| 2-Pentenal-4-one | 4-Methyl-thio-benzoic acid | 3(4-methylthiobenzoyl)-2-pentanal-4-one |
| 4-oxo-2-heptenal | Thioacetic acid | 4-oxo-3-thiohexanal |

In addition to being a reaction sequence intermediates, the 2-thia substituted 1,4 diones as exemplified above are also useful for altering the organoleptic properties of consumable materials. Thus, for example, 3-thioacetyl-2,5-hexane-dione has a roasted meat aroma and a pot roast and roasted meat flavor tested at levels of 5 ppm. Its flavor threshhold value is at 1 ppm. 3-Mercapto-2,5-hexane dione has a roasted meat aroma and a roasted meat flavor at concentrations of 2 ppm with a threshhold value at 0.5 ppm. The compound 3-thiobenzoyl-2,5-hexane dione has a berry and meat aroma and an allium earthy and horseradish flavor at concentrations of approximately 0.5 ppm. Its threshhold value is at 0.5 ppm. 3-Thiobenzoyl-2,5-hexane dione at 5 ppm evaluated in beef bouillion has a meaty note. 3-Mercapto-2,5-hexane dione evaluated at 12.5 ppm acyl thia or aroyl thia substituted furans which have still other organoleptic properties useful for flavoring foodstuffs.

The cyclization reaction carried out in cyclizing the 2-thia substituted-1,4-dione is carried out in the presence of a cyclization agent, preferably, an enol ester such as isopropenyl acetate. The cyclization is also carried out in the presence of such a catalyst as concentrated sulfuric acid, zinc chloride, boron trifluoride, aluminum trichloride and para-toluene sulfonic acid, each of these being acid catalysts. Preferably, the ratio of isopropenyl acetate to 2-thia substituted 1,4 dione is 4 or 5:1. The ratio of acid catalyst to isopropenyl acetate is from 0.001 up to 0.05 (mole ratio). The cyclization reaction may be run at temperatures of between 25°C up to reflux at atmospheric pressure (96°C). Still greater reflux temperatures may be used if the pressure is greater than atmospheric. Furthermore, in place of isopropenyl acetate as a cyclization reagent, acetic anhydride or propionic anhydride may be used. Ratios of acetic anhydride or propionic anhydride to 2-thia substituted 1,4 dione are preferably 4 or 5:1 (mole ratio).

In the event that the resulting 3-thia furan is desired to be used as a fool flavor additive, the reaction product is purified by appropriate extraction and distillation techniques. Thus, the following 3-thia furans produced in this manner have useful organoleptic properties giving rise to their use as foodstuff flavors as set forth in an illustrative manner in the following table:

| 2-thia Substituted 1,4-dione Reactant | 3-thio furan Reaction Product | Flavor Properties of 3-thia furan Reaction Product |
| --- | --- | --- |
| 3-thio acetyl-2,5-hexane dione | 2,5-dimethyl-3-thio acetyl furan | Roasted meat and gravy-like aroma roasted meat flavor at 2 ppm (threshhold value 0.05 ppm) Sweet floral horseradish fragrance |
| 3-propyl thia-2,5-hexane dione | 3-propyl thia-2,5 dimethyl furan | Roasted meat aroma roasted meat flavor at 5 ppm |
| 3-thio benzoyl 2,5-hexane dione | 2,5-dimethyl-3-thio benzoyl furan | Cooked chicken-like aroma with roasted meat nuance; fatty floral-like eggy flavor at 2 ppm (threshhold 0.1 ppm) |
| 4-oxo-3-thiol oxanal | 2-propyl-3-thio-acetyl furan | A sweet, allium, roasted aroma and taste at 0.25 ppm. |

An optional additional step is hydrolysis of the 3-thia furan to form 3-mercapto furan having the structure:

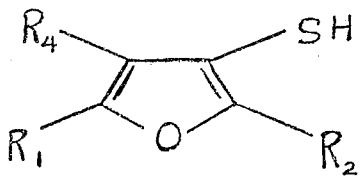

Thus, 2-methyl-3-furan thiol is indicated to have a good meaty aroma at column 14, line 8 of U.S. Pat. No. 3,666,495. It must be emphasized that the hydrolysis step can only be carried out wherein $R_3$ is either acyl or aroyl; and not where $R_3$ is alkyl. The hydrolysis reaction is carried out in the presence of strong aqueous base, for example, sodium hydroxide, potassium hydroxide, sodium carbonate, lithium carbonate, potassium carbonate, and lithium hydroxide. The mole ratio of base to 3-thia furan is preferably 1:1 but may be as high as 3:1 or as low as 0.01:1. In addition to solely aqueous solutions of base, mixtures of alcohol (e.g., methanol and ethanol) and water may be used as solvents in the hydrolysis reaction. The hydrolysis temperature may vary from room temperature to reflux. In the event that the basic solution is a solution which is alcoholic (substantially purely alcoholic) the alkali metal thiafuran will be formed.

Re-acylation of the 3-furan thiol to yield still other acyl thia furans or aroyl thia furans is carried out by reaction of the appropriate acyl or aroyl halide with the 3-furan thiol in the presence of an appropriate solvent such as diethyl ether, tetrahydro furan, or cyclohexane and in the presence of preferably a strong organic base such as pyridine or α-picoline. This final optional step of re-acylation or re-aroylation of the 3-furan thiol lends a very high degree of versatility to our process. Thus, for example, the following table sets forth the several compounds which can be conveniently formed having a large number of organoleptic properties giving rise to a wide field of flavor uses:

| Name of Compound | Organoleptic Property |
| --- | --- |
| 2-Methyl-3-thio-butyryl furan | Sweet, fruity anise-like and liver-like aromas; anise-like sweet fruity roasted meat flavor at 0.05 ppm concentration. |
| 2,5-Dimethyl-3-thio-isobutyryl furan | Meaty, ham, green vegetable aroma; ham-like meaty vegetable nutty flavor at 0.1 ppm concentration. |
| 2,5-Dimethyl-3-thio-isovaleryl furan | Creamy cocoa-like sweet aroma. Cocoa powder creamy green flavor at 0.1 ppm concentration. |
| 2-Methyl-3-thio-isovaleryl furan | Green meaty vegetable-like aroma. Green meaty vegetable-like HVP-like flavor at 0.11 ppm concentration. |
| 2-Methyl-3-(2-thio-furoyl) furan | HVP-like, meaty aroma; HVP-like, liver-like meaty flavor at 0.02 ppm conentration. |
| 2,5-Dimethyl-3-(2-thio-furoyl) furan | HVP-like, meaty aroma. HVP-like meaty flavor at 0.1 ppm. |
| 2-Methyl-3-thio-octanoyl-furan | Meaty, sour, floral aroma; meaty, sour, floral HVP-like flavor at 0.1 ppm concentration. |
| 2,5-Dimethyl-3-thio-octanoyl furan | Meaty brothy aroma; meaty, brothy, nutty aroma with HVP after-taste at 0.1 ppm concentration. |
| 2,5-Dimethyl-3-thio-benzoyl furan | Cooked chicken-like roasted meat-like aroma; floral-like, fatty flavor at 2 ppm (0.1 ppm threshhold). |
| 2-Methyl-3-thiopivaloyl furan | Roasted meat, sweet aroma; roasted meat vegetable-like flavor at 0.1 ppm concentration. |
| 2,5-Dimethyl-3-thio-pivaloyl furan | Sweet, meaty chicken-like aroma; sulphury meaty flavor at 0.5 ppm. |
| 2,5-Dimethyl-3-thio-hexanoyl furan | Meaty, green, creamy aroma; meaty, green, creamy, nutty flavor at 0.5 ppm (0.1 ppm threshhold level). |
| 2,5-Dimethyl-3-thio-(2-ethylbutyryl) furan | At 0.1 ppm, heavy roasted aroma and sweet, nutty, roasted taste. At 0.2 ppm sweet roasted, hazelnut roasted, sweet aroma and taste; At 0.5 ppm, sweet mouthfeel, St. John's bread-like notes and hydrolyzed vegetable protein aroma and taste, with a bloody, meaty lasting aftertaste. |

| Name of Compound | Organoleptic Property |
| --- | --- |
| 2-Methyl-3-thio(2-ethyl-butyryl) furan | At 0.1 ppm, sweet meat, nutty, earty, meaty, hydrolyzed vegetable protein, meat extract aroma and taste. |
| 2,5-Dimethyl-3-thio (2-methylbutyryl) furan | At 0.05 ppm, meaty, roasted, sweet aroma and taste. At 0.1 ppm, sweet, roasted aroma and taste. |
| 2-Methyl-3-thio(2-methyl-butyryl) furan | At 0.1 ppm, sweet, roasted aroma and taste. |
| 2,5-Dimethyl-3-thio-cinnamoyl furan | Meaty, brown sugar, green walnut aroma; meaty, rubbery, walnut sweet flavor at 2 ppm concentration. |
| 2,5-Dimethyl-3-thio(m-toluoyl) furan | Roasted meat, lier, sulphury aroma; meaty green roasted meat liver, sulphury fresh walnut kernel flavor at 1 ppm. |
| 2,5-Dimethyl-3-thio(2-methyl-2-pentenoyl) furan | Meaty, sweet, HVP, creamy aroma; sweet roasted meat, rubbery flavor at 0.1 ppm. |

The following examples are given to illustrate embodiments of the invention as it is presently preferred to practice it. It will be understood that these examples are illustrative and the invention is not to be considered as restricted thereto except as indicated in the appended claims.

EXAMPLE I (Preparation of Cis-3-hexene-2,5-dione)

In a 1000 ml round bottom flask fitted with condenser and magnetic stirrer are placed 200 g of 2,5-dimethoxy-2,5-dimethyl-2,5-dihydrofuran and 200 ml of a 1% aqueous acetic acid solution. The resulting solution is heated to reflux, refluxed for 2 minutes cooled with an ice bath to 25°C and 625 ml of a 2% sodium bicarbonate solution is added. The solution is saturated by addition of 23 g of sodium chloride and extracted with methylene chloride (1 × 200 ml and 3 × 100 ml). After drying over sodium sulfate removal of the methylene chloride in vacuo gives 142 g of crude cis-3-hexene-2,5-dione which by GLC analysis is about 90% product having the structure:

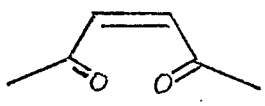

EXAMPLE II (Preparation of 3-Thioacetyl-2,5-hexanedione)

In a 1000 ml round bottom flask fitted with magnetic stirrer, thermometer, addition funnel and reflux condenser are placed 142 g of crude cis-3-hexene-2,5-dione (ex Example I), 380 ml of ether and 5 drops of piperidine. Thioacetic acid (96.6g) is added over a period of one hour. When about one-eighth of the thioacetic acid is added the solution begins to reflux which continues during the remainder of the addition. After addition is complete the mixture is allowed to stand for 85 minutes. Ether is then removed in vacuo (water asperator) to give 235 g of crude material containing about 91% 3-thioacetyl-2,5-hexanedione. Distillation of a 134 g portion of the crude gives 84.5 g of 3-thioacetyl-2,5-hexanedione boiling at 86° to 87°C at 0.5 torr. NMR, IR and mass spectral analysis confirm the structure:

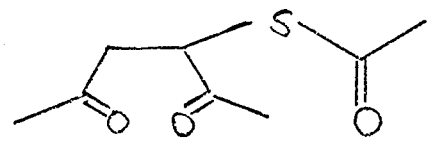

EXAMPLE III (Preparation of 2,5-Dimethyl-3-thioacetyl furan using isopropenyl acetate)

In a 500 ml three necked round bottom flask fitted with reflux condenser, thermometer, mechanical stirrer and addition funnel is placed 225 ml of isopropenyl acetate. The isopropenyl acetate is heated to reflux and 0.5 ml of concentrated sulfuric acid is added. A solution of 25 g of 3-thioacetyl furan (produced according to Example II) in 25 ml of isopropenyl acetate is added over a 20 minute period while maintaining reflux. The mixture is heated at reflux for an additional 20 minutes and then cooled to room temperature during which time 10 g of sodium bicarbonate is added. After removal of isopropenyl acetate in vacuo (35° at 20 mm), 50 ml of benzene is then added and the mixture is placed in a separatory funnel. 10 ml of water is then added to the mixture, and when carbon dioxide evolution stops, the aqueous layer is separated. Concentration in vacuo (35° bath, 20 mm) of the organic phase gives 22.2 g of a dark brown oil. Distillation of the oil gives 16.5 g of 2,5-dimethyl-3-thioacetyl furan boiling at 47° to 48° C at 0.25 mm.

EXAMPLE IV (Preparation of 2,5-Dimethyl-3-furanthiol)

In a 1000 ml, three-necked flask fitted with thermometer, reflux condenser, nitrogen inlet and mechanical stirrer is placed 35 g of 2,5-dimethyl-3-thioacetyl furan (Produced by the process of Example III) and 350 ml of 15% sodium hydroxide solution. The two phase mixture is heated to reflux and after 35 minutes becomes homogeneous. The mixture is heated another 20 minutes and cooled to room temperature. The pH of the solution is adjusted to 1 by the addition of 310 ml of 20% sulfuric acid and the resulting mixture extracted with ether (3 × 100 ml). Washing of the combined ether solutions with saturated sodium chloride solution (4 × 75 ml), drying with anhydrous sodium sulfate and solvent removal in vacuo (25°C at 55 mm) gives 26.2 g of crude material. Distillation of the crude material gives 17.3 g of 2,5-dimethyl-3-furanthiol boiling at 79°C at 43 mm. MS, NMR and IR analysis confirm the material as 2,5-dimethyl-3-furanthiol.

EXAMPLE V (Preparation of 3-Propylthio-2,5-hexanedione

In a 500 ml flask fitted with thermometer, addition funnel, reflux condenser and magnetic stirrer are placed 95 ml of ether 3-hexene-2,5-dione and one drop of piperidine. Addition of n-propanethiol is started and as the addition progresses more piperidine is added (33 drops total). After standing 18 hours, the solution is washed successively with 10% hydrochloric acid (2 × 7.5 ml), saturated sodium chloride solution (10 ml), 5% sodium bicarbonate solution and saturated sodium chloride solution (2 × 10 ml). The ether solution is dried over sodium sulfate and concentrated to give 51.4 g of a dark yellow oil. Analysis by GLC shows the material to be essentially pure 3-thiopropyl-2,5-hexanedione. Mass spectral analysis shows molecular ion 188 then descending order 43, 103, 41, 145, 71, 114 and 61 m/e units.

EXAMPLE VI (Preparation of 3-Thiopropyl-2,5-dimethyl furan)

In a 500 ml, three-necked round bottom flask fitted with reflux condenser, magnetic stirrer, calcium chloride drying tube and a pot thermometer, is placed 300 ml of isopropenyl acetate. The isopropenyl acetate is heated to reflux and 30 g of 3-thiopropyl-2,5-hexanedione are added. When refluxing resumes, 0.3 ml of concentrated sulfuric acid is added, and the mixture is allowed to reflux for one hour and 40 minutes. While cooling, 2 g of sodium bicarbonate is added. After cooling to room temperature the solid is removed by filtration and the excess isopropenyl acetate is removed in vacuo. The residue is dissolved in benzene (55 ml) and washed with 10 ml of saturated sodium bicarbonate. After drying the solution with sodium sulfate, solvent removal in vacuo gives 36.5 g of a brown oil. Vacuum distillation gives 13.4 g of 3-thiopropyl-2,5-dimethyl furan as a light yellow oil boiling at 70°–71.5°C at 4 torr.

NMR, IR and mass spectral analysis confirm the structure:

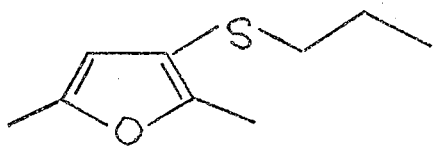

EXAMPLE VII (Preparation of 3-Mercapto-2,5-hexanedione)

To 150 ml of a 2% sodium hydroxide solution in a flask fitted for stirring is added 10 g of 3-thioacetyl-2,5-hexanedione. After stirring for one hour the pH of the mixture is adjusted to 5–6 by the addition of dilute (10%) hydrochloric acid, the solution is saturated with sodium chloride solution and extracted with ether (4 × 25 ml). The ether extracts are combined, washed with saturated sodium chloride solution (15 ml), dried and concentrated in vacuo to give 6.2 g of crude 3-mercapto-2,5-hexanedione. Vacuum distillation gives 2.5 g of 3-mercapto-2,5-hexanedione boiling at 57°–59°C at 0.85 torr. NMR, IR and mass spectral analysis confirm the structure as 3-mercapto-2,5-hexanedione.

EXAMPLE VIII (Preparation of 2-Methyl-3-furanthiol)

A. 4-Oxo-2-Pentanal

Into a 5 liter, three-necked flask fitted with mechanical stirrer, thermometer and vacuum take-off are placed 600 g of 2-methyl-2,5-dimethoxy-2,5-dihydrofuran and 2400 ml of deionized water. After 20 minutes of stirring at room temperature, the mixture becomes homogeneous and has a pale yellow green color. Analysis of a sample of the reaction mixture by GLC after 3.25 hours shows 22% methanol, 67% 4-oxo-2-pentanal and 9% starting material. Vacuum (26 torr.) is applied to the reaction mixture while maintaining the temperature of the reaction mixture between 25° and 30°C. After 3.25 hours GLC analysis shows 13% methanol, 82% 4-oxo-2-pentanal and 3.2% starting material. The vacuum is removed and the reaction mixture is allowed to stand at room temperature overnight. Analysis after standing overnight shows 12.9% methanol, 85% 4-oxo-2-pentanal and 2.1% starting material.

B. 3-thioacetyl-4-oxo-pentanal

In a 5 liter, three-necked flask fitted with mechanical stirrer, thermometer and addition funnel are placed 2325 ml of the solution obtained in (A) and 2 ml of piperidine diluted in 5 ml of water. To this solution is added a mixture of thioacetic acid (292.3 g) and piperidine (13 ml) over a 20 minute period. After standing an additional 10 minutes, 20 ml of concentrated hydrochloric acid is added, the resulting mixture poured into a separatory funnel and the oil layer removed. The aqueous layer is extracted with benzene (500 ml) and methylene chloride (2 × 500 ml). The benzene extract is combined with the oil layer and the mixture is dried over sodium sulfate. The methylene chloride extracts are combined and dried over sodium sulfate. Solvent removal in vacuo (40–45° bath at 15 torr.) gives 414.5 g of crude oil from the benzene extract and 172.5 g of crude oil from the methylene chloride extracts. The crude 3-thioacetyl-4-oxo-pentanal is used "as-is" in the next step.

C. 2-Methyl-3-thioacetyl furan

In a 12 liter, three-necked flask fitted with stirrer, reflux condenser, thermometer and addition funnel are placed 2950 ml of ispropenyl acetate and 2 ml of concentrated sulfuric acid. The mixture is heated to reflux and a solution of crude 3-thioacetyl-4-oxo-pentanal (587 g) (obtained in Part (B) supra) in 1,170 ml of ispropenyl acetate is added over a 35 minute period. After refluxing an additional 40 minutes sodium bicarbonate (35 g) is added and removal of excess isopropenyl acetate in vacuo is commenced. The pressure is gradually decreased from 200 to 30 torr. as the temperature of the reaction mixture drops from 90°C to 30°C at which temperature it is maintained until the volume of the reaction mixture is about 1500 ml. The material is further concentrated in vacuo (bath temperature 50°C and 5 torr.) to form a dark brown oil. The concentrate is diluted with 750 ml of benzene and washed with 250 ml of water. After drying over sodium sulfate solvent removal in vacuo (40°–50°C bath temperature and 10 mm) gives 647 g of a dark brown oil. Distillation of this oil gives 26.8 g of material boiling at 67°–70°C at 1.1 mm. which is 62% 2-methyl-3-thioacetylfuran. Redistillation gives 150 g of 2-methyl-3-thioacetylfuran of 86% purity determined by GLC boiling at 73°–76°C at 5.8 to 6.2 mm Hg. pressure.

D. Hydrolysis of 2-Methyl-3-thioacetylfuran to 2-methyl-3-furanthiol

A 5% solution (1500 ml) of sodium hydroxide in water is heated to reflux under nitrogen. When reflux commences 151 g of 2-methyl-3-thioacetylfuran is added over a 15 minute period. After 5 minutes heating is stopped and the mixture allowed to cool. When the temperature reaches 30°C, 258.1 g of sodium dihydrogen phosphate monohydrate and 10 ml of acetic acid are added. After the salt is dissolved the mixture is extracted with methylene chloride (3 × 250 ml). After drying the methylene chloride extracts by filtration through sodium sulfate and washing the sodium sulfate with 100 ml of methylene chloride, the combined methylene chloride solutions are concentrated in vacuo (30° at 25 mm) to yield 94.8 g of crude 2-methyl-3-furanthiol. Distillation gives 64.6 g of 2-methyl-3-furanthiol boiling at 55°–56° at 41–42 mm.

EXAMPLE IX (Preparation of 2-Thioacetylfuran)

A. Preparation of 2-Butene-1,4-dial

A mixture of 2,5-dimethoxy-2,5-dihydrofuran (20 g), water (80 ml) and acetic acid (3 drops) is stirred for 150 minutes at room temperature, 22 minutes at 40°C and 90 minutes between 60°C and 75°C. GLC analysis at this point indicates 15.7% starting material and 83.5% 2-butene-1,4-dial. The mixture is cooled to 25°C and sodium bicarbonate (0.3 g) is added.

B. Preparation of 3-Thioacetyl-1,4-butanedial

To the aqueous solution obtained in paragraph A, supra, is added 10 g of thiolacetic acid during a 14 minute period. During the addition, the temperature is kept below 30°C by intermittent application of a cooling bath. After 110 minutes, the reaction mixture is extracted with methylene chloride (3 × 35 ml). The combined methylene chloride extracts are dried and then concentrated in vacuo to give 17.3 g of yellow oil containing about 80% 2-thioacetyl-1,4-butanedial. The compound is identified through mass spectral, NMR and IR analysis as having the structure:

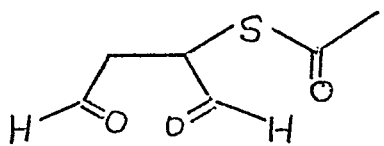

M.S. — No molecular ion; remaining peaks in decreasing intensity — 43, 29, 27, 45, 55, 60, 84, 100 and 142 m/e units.

NMR (C DCl$_3$) δ 2,38 (s,3) 3.02 (multiplet 2 ,J=10H$_z$) 4.46 (t,1J=10H$_z$), 9.40 (s,1) and 9.68 (s,1) ppm.

IR (thin film) — 2850, 2750, 1720, 1700 (shoulder), 1388, 1352, 1132 and 958 cm$^{-1}$ C. Preparation of 3-thioacetylfuran In a 500 ml flask fitted with mechanical stirrer, reflux condenser, addition funnel and thermometer are placed 109 ml of isopropenyl acetate and 0.2 ml of concentrated hydrochloric acid. The resulting mixture is heated to reflux and, when reflux commences, a solution of curde 2-thioacetyl-1,4-butanedial (produced in paragraph B, supra) in 70 ml of isopropenyl acetate is added over a 31 minute period while maintaining reflux. The mixture is heated at reflux for 15 minutes after addition is complete. After cooling to 25°C, sodium bicarbonate (2.4 g) is added and the mixture stirred for 20 minutes. The mixture is concentrated in vacuo and 60 ml of benzene and 25 ml of water are added. The benzene layer is separated, washed with saturated sodium bicarbonate solution (5 × 25 ml), dried with sodium sulfate and concentrated in vacuo to give 14.7 g of an oil. Vacuum distillation gives 1.24 g of 97.5% pure 3-thioacetylfuran. Mass spectral, NMR and IR analysis confirm the structure as 3-thioacetylfuran.

Mass spectrum, molecular ion, then peaks in decreasing intensity; 142, 43, 100, 45, 69, 71, 72 and 73 m/e units.

NMR (CDCl$_3$) δ 2.34 (s,3), 6.38 (d,1,J=1H$_z$) and 7.46 (m,2J=1H$_z$) ppm.

IR (thin film) 3120, 1710, 1495, 1355, 1197, 1147), 1110, 1072, 1010, 953, 940, 870 and 795 cm$^{-1}$.

EXAMPLE X

PREPARATION OF 2,5-DIMETHYL-3-THIO-(2-ETHYLBUTYRYL)FURAN 29 g of 2,5-dimethyl-3-furan thiol (0.226 moles) is dissolved in 200 cc of diethyl ether and charged to a 500 ml reaction vessel with 17.8 g of pyridine (0.226 moles). Alpha-ethyl-n-butyryl chloride (30.5 g) (0.226 moles) is dissolved in 100 ml of ether and the alpha-ethyl-n-butyryl chloride solution is charged slowly to the reaction vessel over a period of 15 minutes. The reaction mass is then stirred for three hours and allowed to remain at room temperature for a period of 72 hours.

The reaction mass is then poured into 500 ml of water thereby creating two phases; an upper ether layer and a lower aqueous phase. The ether layer is washed with 500 ml of 4% hydrochloride acid followed by 500 ml of saturated sodium bicarbonate solution. The ether layer is then dried over an anhydrous sodium sulfate and concentrated to yield an orange oil, crude 2,5-dimethyl-3-thio-(2-ethyl-butyryl)-furan.

The crude material is then distilled at a vapor temperature of 76°–88°C and a pressure of 0.55 mm Hg, yielding 16.6 g of product, confirmed by IR, NMR and mass spectral analysis to have the structure:

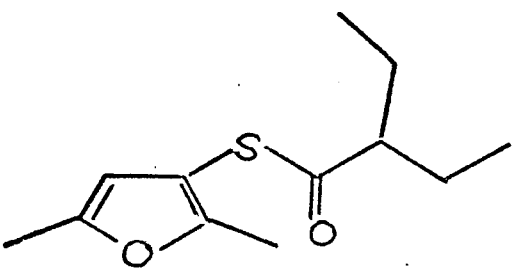

Mass Spectral Analysis:
Molecular Ion, then in descending intensity: 226, 43, 71, 128, 99, 41, 30, 127 m/e

| NMR Spectrum (CDCl$_3$): | |
|---|---|
| | 5.91 (s,1) |
| | 3.62 (m,1) |
| | 2.25 (s,3) |
| | 2.22 (s,3) |
| | 1.64 (m,4) |
| | 0.95 (t,6) ppm |

EXAMPLE XI

PREPARATION OF 2-METHYL-3-THIO-(2-ETHYLBUTYRYL)-FURAN

Into a 500 ml reaction flask equipped with stirrer, thermometer and reflux condenser, a solution of 29 g of 2-methyl-3-furanthiol (0.255 moles) dissolved in 195 ml of diethyl ether is added. 20.2 g of pyridine (0.255 moles) is then added to the reaction vessel. 34.5 g of alpha-ethyl-n-butyryl chloride (0.255 moles) is then dissolved in 100 ml of diethyl ether and this solution is slowly added to the reaction vessel over a period of 15 minutes. When the addition is complete, the reaction mass is stirred for a period of 3 hours and then allowed to remain over a period of 72 hours at room temperature.

The reaction mixture is then poured into 500 ml of water yielding two phases; an upper ether layer and a lower aqueous phase. The ether layer is washed with 500 ml of 4% aqueous hydrochloride acid and then 500 ml of saturated sodium bicarbonate solution. The ether layer is then dried over anhydrous sodium sulfate and is concentrated to yield 43.8 g of a yellow orange oil.

This oil is distilled at a temperature of 73.5–75°C and a pressure of 0.45–0.55 mm Hg to yield 39.0 g of 2-methyl-3-thio-(2-ethylbutyryl) furan, having the structure:

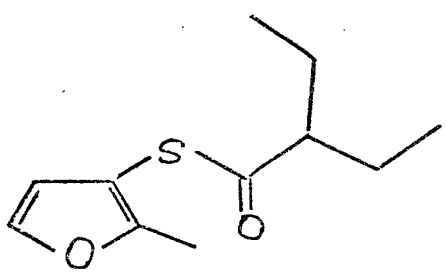

Mass Spectral Analsyis:
Molecular Ion, then in descending intensity: 212, 43, 41, 30, 39, 71, 99, 114, 113 m/e NMR Spectrum (CDCl$_3$):
7.36 (d,1,J=1.8 Hz)
6.30 (d,1,J=1.8 Hz)
2.48 (m,1)
2.24 (s,3)
1.64 (m,4)
0.96 (t,6) ppm

EXAMPLE XII

PREPARATION OF 2,5-DIMETHYL-3-THIO-(2-METHYLBUTYRYL)-FURAN

Into a 500 ml reaction vessel equipped with stirrer, thermometer, reflux condenser and addition funnel, 29 g of 2,5-dimethyl-3-furanthiol (0.226 moles) dissolved in 200 ml of diethyl ether is added. 27.4 g of 2-methyl-butyryl chloride (0.226 moles) dissolved in 100 ml of diethyl ether is then charged to the addition funnel. Over a period of 25 minutes, the 2-methyl-butyryl chloride solution in diethyl ether is added to the reaction mass from the addition funnel with stirring. When addition is complete, the reaction mass is then stirred for a period of 2 hours. At the end of this 2-hour period, 17.8 g of pyridine (0.226 moles) is added to the reaction mass and the reaction mass is stirred for a period of 2 hours.

The reaction mass is then poured into 500 ml of water yielding two phases; an upper clear orange ether layer and a lower aqueous phase in which pyridine hydrochloride is dissolved.

The ether layer is then washed with 500 ml of 4% hydrochloric acid and then 500 ml of a saturated sodium bicarbonate solution. The ether layer is then dried over anhydrous sodium sulfate and concentrated, yielding 40.8 g of an orange oil which is crude 2,5-dimethyl-3-thio-(2-methylbutyryl)-furan. This crude material is then distilled at a temperature of 68°–70.5°C and a pressure of 0.30 mm Hg., yielding 33.8 g of product, 2,5-dimethyl-3-thio-(2-methylbutyryl)-furan, having the structure:

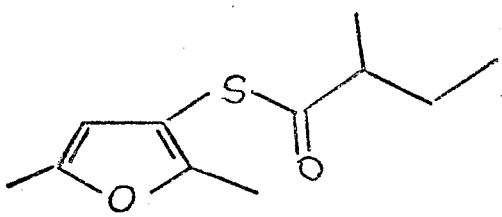

Mass Spectral Analsyis:
Molecular Ion, then in descending intensity: 212, 128, 57, 43, 85, 41, 39 m/e NMR Spectrum (CDCl$_3$):
5.92 (s,1)
2.66 (q,1,J=SHz)
2.28 (s,3)
2.23 (s,3)
1.61 (m,2)
1.12 (d,3,J=SHz)
0.95 (t,3,J=SHz) ppm

EXAMPLE XIII

PREPARATION OF 2-METHYL-3-THIO-(2-METHYLBUTYRYL)-FURAN

Into a 500 ml flask equipped with stirrer, thermometer, reflux condenser and addition funnel, 29 g of 2-methyl-3-furanthiol (0.255 moles) dissolved in 200 ml of diethyl ether is added. 30.5 g of 2-methylbutyryl chloride (0.255 moles) dissolved in 100 ml of diethyl ether is then added to the addition funnel. The 2-methylbutyryl chloride solution is then added to the reaction mass, dropwise, over a period of 15 minutes from the addition funnel. 20.2 g of pyridine (0.255 moles) is then added to the reaction mass and the stirring is continued for another 10 minutes. When addition is complete, the reaction mass is stirred for a period of 80 minutes, after which it is allowed to remain, for a period of 72 hours, at room temperature.

The reaction mass is then poured into 500 ml of water yielding two phases; an aqueous phase having pyridine hydrochloride dissolved therein, and an ether layer. The ether layer is washed with 500 ml of 4% hydrochloric acid and 500 ml of saturated sodium bicarbonate solution. The ether layer is then dried over anhydrous sodium sulfate and concentrated to 39.1 g of a yellow oil, which is crude 2-methyl-3-thio-(2-methylbutyryl)-furan. This crude material is then distilled at a temperature of 65–66°C and a pressure of 0.55 mm Hg., yielding 32.7 g of 2-methyl-3-thio-(2-methyl-butyryl)-furan having the structure:

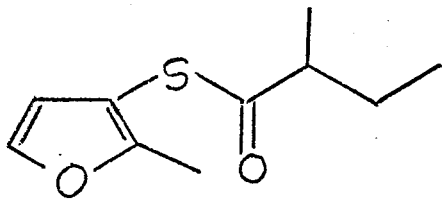

Mass Spectral Analysis:
  Molecular Ion, then in descending intensity: 198, 57, 85, 86, 41, 43, 114, 39 m/e

| NMR Spectrum (CDCl₃): | 7.38 (d,1,J=1.8 Hz) |
|---|---|
| | 6.32 (d,1,J=1.8 Hz) |
| | 2.68 (m,1) |
| | 2.26 (s,3) |
| | 1.67 (m,2) |
| | 1.21 (d,3) |
| | 0.96 (t,3) ppm |

EXAMPLE XIV

PREPARATION OF 2,5-DIMETHYL-3-THIOISOVALERYL FURAN

Into a 25 ml flask equipped with magnetic stirrer, thermometer and addition funnel, are added:

| (i) | 2,5-dimethyl-3-furan thiol | 1.0 g (0.0078 moles) |
|---|---|---|
| (ii) | Diethyl ether | 10 ml |

After stirring for five minutes, 0.62 g pyridine (0.0078 moles) is added to the reaction mass. After the pyridine addition, 0.94 g of isovaleryl chloride (0.0078 moles) is added, dropwise, from the addition funnel, over a 2-minute period, to the reaction mass. A white precipitate forms which is pyridine hydrochloride. The temperature in the flask rises to 35°C. After stirring for a thirty-minute period, the reaction mass is filtered via suction filtration, and the filtrate is concentrated in vacuo, to a yellow-orange liquid (containing a small amount of solid) weighing 1.56 g. The major peak is trapped out by GLC and analyzed via mass spectral, NMR and IR analysis. It is confirmed to be a 2,5-dimethyl-3-thioisovaleryl furan having the structure:

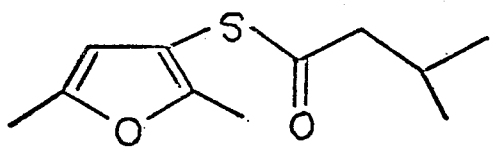

Mass Spectral Analysis:
  Molecular Ion, then in decreasing intensity: 212, 57, 128, 93, 85, 212, 127 m/e NMR Analysis: (CDCl₃):

| Signal | Interpretation |
|---|---|
| 0.97 (d, 6) | —CH₃ / CH₃ |
| 2.17 (s, 3) 2.22 (s, 3) | H₃C—furan—CH₃ |
| 2.45 (m, 2) | >CH₂ |
| 5.84 (s, 1) ppm | —H |

EXAMPLE XV

PREPARATION OF 2,5-DIMETHYL-3-THIOISOBUTYRYL FURAN

Into a 25 ml flask equipped with magnetic stirrer, thermometer and additional funnel, are added:

| (i) | 2,5-dimethyl-3-furanthiol | 1.0 G (0.0078 moles) |
|---|---|---|
| (ii) | Diethyl ether (anhydrous) | 10 ml |

After stirring for 5 minutes, 0.62 g pyridine (0.0078 moles) is added to the reaction mass. After the pyridine addition, 0.83 g isobutyryl chloride (0.0078 moles) is added, dropwise, from the addition funnel, over a 1-minute period, to the reaction mass. A white precipitate forms which is pyridine hydrochloride. The temperature in the flask rises to 35°C. After stirring for a 30-minute period, the reaction mass is filtered by suction filtration, and the filtrate is concentrated in vacuo to an orange liquid weighing 1.32 g. The material is analyzed by GLC analysis and the major peak is trapped and is conformed by GLC, NMR, IR and mass spectral analysis to be 2,5-dimethyl-3-thioisolbutyryl furan, having the structure:

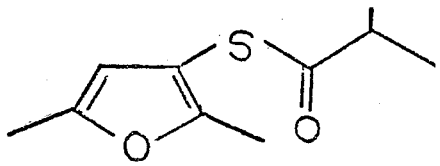

Mass Spectral Analysis:
  Molecular Ion, then in decreasing intensity: 198, 93, 128, 71, 198, 127 m/e NMR Analysis (CDCl₃):

| Signal | Interpretation |
|---|---|
| 1.20 (d, 6) | —CH₃ / CH₃ |
| 2.16 (s, 3) 2.22 (s,3) | H₃C—furan—CH₃ |
| 2.80 (m, 1) | CH |
| 5.85 (s, 1) ppm | —H |

EXAMPLE XVI

PREPARATION OF 2-METHYL-3-THIOISOVALERYL FURAN

Into a 25 ml flask equipped with magnetic stirrer, thermometer and addition funnel, are added:

| (i) | 2-methyl-3-furanthiol | 1.0 g (0.0088 moles) |
|---|---|---|
| (ii) | Diethyl ether (anhydrous) | 10 ml |

After stirring the mass for five minutes, 0.70 g pyridine is added thereto (0.0088 moles). After the pyridine addition, 1.06 g isovaleryl chloride (0.0088 moles) is added, dropwise, from the addition funnel, over a 3-minute period, to the reaction mass. A white precipitate forms which is pyridine hydrochloride. The temperature of the reaction mass rises to 38°C. After stirring for a thirty-minute period, the reaction mass is filtered via suction filtration and concentrated in vacuo to give a yellow-green liquid containing a small amount of solid and weighing 1.0 gm. A sample is analyzed using GLC analysis and found to contain 93% product. The major peak is trapped using GLC and as confirmed by mass spectral, IR and NMR analysis is 2-methyl-3-thioisovaleryl furan, having the structure:

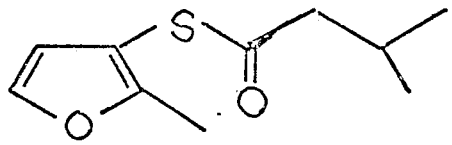

Mass Spectral Analysis:
  Molecular Ion, then decreasing intensity: 198, 57, 85, 41, 114, 198, 93, 113 m/e

| NMR Analysis:: (CDCl₃): | |
|---|---|
| Signal | Interpretation |
| 0.97 (d, 6) | CH₃ CH₃ |
| 2.19 (m, 1) | —CH |
| 2.21 (s, 3) | —CH₃ |
| 2.46 (d, 2) | —CH₂ |
| 6.28 (d, 1) | —H |
| 7.31 (d, 1) ppm | —H |

EXAMPLE XVII

PREPARATION OF 2-METHYL-3-(2-THIOFUROYL)-FURAN

Into a 25 ml flask equipped with magnetic stirrer, thermometer and addition funnel, are added:

| (i) | 2-Furoyl chloride | 1.14 g (0.0088 moles) |
|---|---|---|
| (ii) | Diethyl ether (anhydrous) | 10 ml |

After stirring for two minutes, 0.70 g dry pyridine (0.0088 moles) are added to the mass. After the pyridine addition, 1.0 g of 2-methyl-3-furan thiol is added, dropwise, from the addition funnel, over a period of 2 minutes, to the reaction mass. The temperature rises to 38°C and a white precipitate forms (pyridine hydrochloride. The reaction mass is then stirred for a period of thirty minutes, after which period of time, it is filtered via suction filtration. The filtrate is concentrated in vacuo to a yellow liquid weighing 1.65 g. This material, as confirmed by GLC, mass spectral IR and NMR analysis is 2-methyl-3-thiofuroyl furan having the structure:

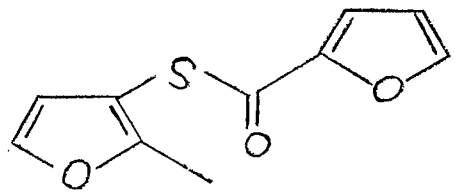

Mass Spectral Analysis:
  Molecular Ion, when descending intensity: 202, 95, 39, 43, 113 m/e

| NMR Spectrum (CDCl₃): | 7.57 (d,1), |
|---|---|
| | 7.36 (d,2), |
| | 7.30 (d,1), |
| | 6.51 (q,1), |
| | 6.33 (d,1), |
| | 2.26 (s,3) ppm |

EXAMPLE XVIII

Preparation of 2,5-Dimethyl-3-(2-Thiofuroyl)-Furan

Into a 25 ml flask equipped with magnetic stirrer thermometer and addition funnel, are added:

| (i) | 2,5-Dimethyl-3-furanthiol | 1.0 g (0.0078 moles) |
|---|---|---|
| (ii) | Diethyl ether (anhydrous) | 10 ml |

After stirring for 2 minutes, 0.62 pyridine (0.0078 moles) is added to the reaction mass. After the pyridine addition, 1.01 g 2-furoyl chloride (0.0078 moles) is added, dropwise, from the addition funnel, over a two-minute period, to the reaction mass. The temperature of the reaction mass rises to 36°C and a white precipitate forms (pyridine hydrochloride). The reaction mass is then filtered via suction filtration, and the filtrate is concentrated in vacuo to an amber liquid containing a small amount of solid, and weighing 1.26 g and containing 87.9% 2,5-dimethyl-3-(2-thiofuroyl)-furan (ascertained by GLC analysis). Mass spectral, NMR and IR analysis confirm the structure as being:

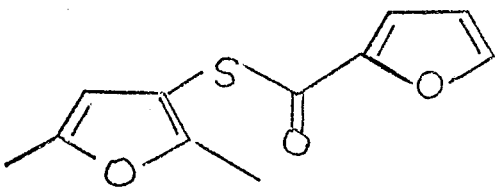

Mass Spectral Analysis:
  Molecular Ion, then in decreasing intensity: 222, 95, 43, 222, 41, 194, 57 m/e NMR Analysis: (CDCl₃):

| Signal | Interpretation |
|---|---|
| 2.23 (s,3) 2.25 (s,3) | 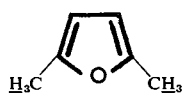 |
| 5.92 (s,1) | —H |
| 6.53 (m,1) | —H |
| 7.19 (s,1) | —H |
| 7.57 (s,1) ppm | —H |

EXAMPLES XIX

Preparation of 2-METHYL-3-THIOOCTANOYL FURAN

Into a 25 ml flask, equipped with magnetic stirrer, thermometer and addition funnel, are added:

| (i) | 2-Methyl-3-furan thiol | 1.0 g (0.0088 moles) |
|---|---|---|
| (ii) | Diethyl ether (anhydrous) | 10 ml |

After stirring the mass for five minutes, 0.70 g pyridine (0.0088 moles) is added thereto. After the pyridine addition, 1.43 g octanoyl chloride (0.0088 moles) is added, dropwise, over a two-minute period, from the addition funnel, to the reaction mass. A white precipitate forms (pyridine hydrochloride) and the temperature of the reaction mass rises to 38°C. After addition of the octanoyl chloride is complete, the reaction mass is stirred for a period of thirty minutes, after which period it is fiiltered via suction filtration. The resulting filtrate is then concentrated in vacuo giving an amber liquid containing a small amount of solid and weighing 1.30 g. The major component is trapped using GLC and is determined by IR, mass spectral and NMR analysis to be 2-methyl-3-thiooctanoyl furan, having the structure:

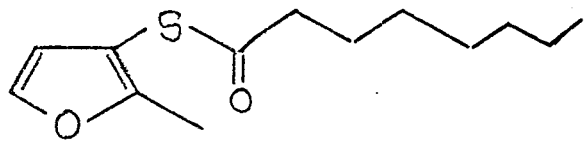

Mass Spectral Analysis:
Molecular Ion, then in decreasing intensity: 240, 57, 177, 43, 114, 41, 240 m/e NMR Analysis: (CDCl₃):

| Signal | Interpretation |
|---|---|
| 0.85 (m, 3) | —CH₃ |
| 1.38 (m, 8) | —[CH₂]₄ |
| 1.68 (m, 2) | —CH₂— |
| 2.2 (s, 3) | —CH₃ |
| 2.57 (d, 2) | —CH₂— |
| 6.25 (d, 1) | —H |
| 7.30 (d, 1) ppm | —H |

EXAMPLE XX

PREPARATION OF 2,5-DIMETHYL-3-THIOOCTANOYL FURAN

Into a 25 ml flask equipped with magnetic stirrer, thermometer and addition funnel, are added:

| (i) | 2,5-Dimethyl-3-furanthiol | 1.0 g (0.0078 moles) |
|---|---|---|
| (ii) | Diethyl ether (anhydrous) | 10 ml |

After stirring for three minutes, at room temperature, 0.62 g dry pyridine (0.0078 moles) is added to the reaction mass. After the pyridine addition, 1.26 g n-octanoyl chloride is added, dropwise, over a period of two minutes, from the addition funnel to the reaction mass. A white precipitate forms (pyridine hydrochloride) and the temperature of the reaction mass rises to 35°C. After the addition of the n-octanoyl chloride, the reaction mass is stirred for a period of thirty minutes, after which the mass is filtered via suction filtration. The resulting filtrate is concentrated in vacuo giving an amber liquid weighing 1.63 g. The major product is trapped using GLC and is confirmed to be 2,5-dimethyl-3-thiooctanoyl furan by mass spectral, NMR and IR analysis, having the structure:

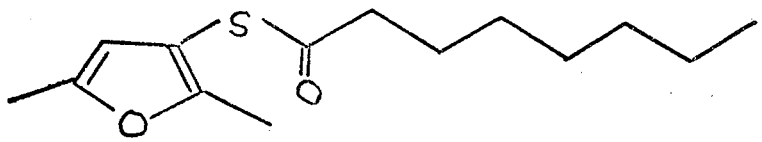

Mass Spectral Analysis:
Molecular Ion, then in decreasing intensity: 254, 128, 57, 43, 254, 127, 41 m/e NMR Analysis (CDCl₃):

| Signal | Interpretation |
|---|---|
| 0.86 (m,3) | —CH₂CH₃ |
| 1.28 (m,8) | —[CH₂]₄—CH₃ |
| 1.64 (d,2) | —C(O)—CH₂CH₂—CH₂— |
| 2.25 (s,3) 2.20 (s,3) | 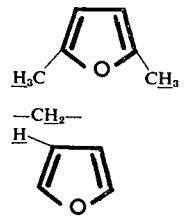 |
| 2.56 (t,2) | —CH₂— |
| 5.84 (s,1) ppm | H— (furan) |

EXAMPLE XXI

PREPARATION OF 2,5-DIMETHYL-3THIOBENZOYL FURAN

Into a 50 ml round bottom, three-neck flask equipped with magnetic stirrer, 10 ml addition funnel, nitrogen inlet, y-tube and thermometer, 30 ml diethyl ether, 1.86 g of anhydrous pyridine (0.0235 moles) and 3 g of 2,5-dimethyl-3-furan thiol (0.0235 moles) are charged. Over a period of 25 minutes, 3.30 g of beenzoyl chloride (0.0235 moles) is added to the reaction mass with stirring. After the addition of the benzoyl chloride is complete, 6 ml of diethyl ether is added to the reaction mass, which is then stirred for a period of 40 minutes at room temperature. At the end of this period of time, the resultant slurry (orange solution and heavy white solid) is filtered through sodium sulfate. The filter cake is washed with diethyl ether. The combined filtrates are concentrated on a rotary evaporator, yielding a crude yellow oil, which is crude 2,5-dimethyl-3-thiobenzoyl furan. The filter cake is then washed with n-pentane (30ml) yielding a yellow solution which is then evaporated, yielding a heavy yellow oil. The oils are combined to yield 4.25 g of crude material which is then distilled at a temperature of 118°–122°C at 0.5 mm Hg. pressure, yielding 2,5-dimethyl-3-thiobenzoyl furan, the structure of which is confirmed by mass spectral analysis, NMR analysis and IR analysis to be:

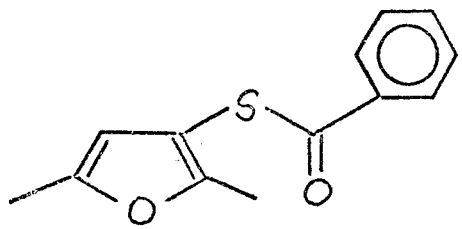

Mass Spectral Analysis:
 Moleculaar Ion, then decreasing intensity: 232, 105, 77, 43, 51

NMR Spectrum (CDCl$_3$):
7.95 (m,2)
7.42 (m,3)
5.92 (s,1)
2.26 (s,3)
2.22 (s,3) ppm

EXAMPLE XXII

PREPARATION OF 2,5-DIMETHYL-3-THIOCINNAMOYL FURAN

In a 250 ml flask is placed 5 g of 2,5 -dimethyl-3-furanthiol, 40 ml diethyl ether, 3.08 g pyridine and 6.48 g cinnamoyl chloride. The resulting mixture is permitted to stand for 12 hours. The mixture is then washed with 17 ml H$_2$O, 17 ml 4% HCl and 17 ml of saturated NaH CO$_3$ solution. The ether layer is then dried over anhydrous Na$_2$SO$_4$ and the solvent is removed in vacuo to give crude 2,5-dimethyl-3-thiocinnamoyl furan as a yellow crystalline solid. Recrystallization from hexane gives a sample of 2,5-dimethyl-3-thiocinnamoyl furan melting a 64°–66°C, having the structure:

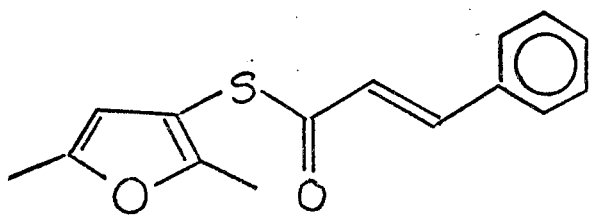

Mass Spectral Analysis:
 Molecular Ion, then in descending intensity: 258, 131, 103, 43, 77 m/e NMR Spectrum (CDCl$_3$):
7.80 (d, 1, J=8 Hz)
7.40 (m, 5)
6.70 (d, 1, J=8 Hz)
5.90 (s, 1)
2.12 (s, 3)
2.10 (s, 3)

EXAMPLE XXIII

PREPARATION OF 2,5-DIMETHYL-3-THIO-(m-TOLUOYL) FURAN

In a 250 ml flask is placed 5 g of 2,5-dimethyl3-furanthiol, 40 ml diethyl ether, 3.08 g pyridine and 6.03 g m-toluoyl chloride. The resulting mixture is permitted to stand for 12 hours. The mixture is then washed with 17 ml H$_2$O, 17 ml 4% HCl and 17 ml of saturated NaHCO$_3$ solution. The ether layer is then dried over anhydrous Ha$_2$SO$_4$ and the solvent is removed in vacuo to give crude 2,5-dimethyl-3-thio-(m-toluoyl) furan. Distillation of this residue gives 3.3 g boiling at 123.5°C at 0.27 mm Hg. pressure, having the structure:

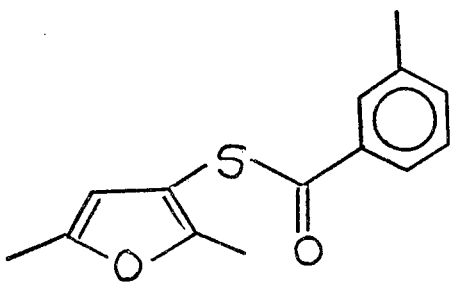

Mass Spectral Analysis:
 Molecular Ion, then in descending intensity: 246, 119, 43, 91, 127 m/e NMR Spectrum (CDCl$_3$):
7.76 (m, 2)
7.30 (m, 2)
5.90 (s, 1)
2.43 (s, 3)
2.22 (s, 3)
2.20 (s, 3) ppm

EXAMPLE XXIV

PREPARATION OF 2,5-DIMETHYL-3-FURANTHIOL/SODIUM HYDROXIDE SEMISOLID MASS

In a 50 ml three-necked flask equipped with reflux condenser, magnetic stirrer and thermometer is placed 20 ml methanol and 0.5 g NaOH. The mixture is stirred until homogeneous and then 5.1 g of 2,5 -dimethyl-3-thioacetyl furan is added. The mixture is allowed to stand for two hours and then brought to reflux for two hours. The resulting orange colored solution is concentrated in vacuo to remove the methanol, resulting in an orange semisolid.

EXAMPLE XXV

PREPARATION OF 2,5-DIMETHYL-3-THIO-(2-METHYL PENTENOYL) FURAN

Into a 100 ml three-neck reaction flask equipped with reflux condenser, calcium chloride drying tube, magnetic stirrer and thermometer is placed 4.5 g of the 2,5-dimethyl-3-furanthiol/sodium hydroxide semisolid mass prepared according to the process of Example XXIV. This material is slurried in 25 ml of tetrahydrofuran, resulting in an almost complete solution. The resulting sollution is then stirred rapidly. To this solution is added 4.0 g of 2-methyl-2-pentenoyl chloride, rapidly, dropwise, over a period of approximately one minute, resulting in a temperature rise of from 25°C to 37°C and precipitation of a white solid, sodium chloride.

The reaction mass is analyzed by GLC analysis after five minutes and thirty minutes and both analyses show that the same material has been produced (GLC conditions: 8 feet × ¼ inch SE-30, programmed 130° to 225°C at 6°/minute; flow rate-50 ml/min.)

The reaction mass is then stirred for a period of one hour at room temperature. The solids formed in the mass are removed by means of gravity filtration and the resulting filtrate is concentrated in vacuo to a reddish orange liquid weighing 5.2 g. This major material is trapped using GLC. Mass spectral, NMR and IR analyses indicate that the resultant material is 2,5-dimethyl-3-thiol-(2-methyl pentenoyl) furan having the structure:

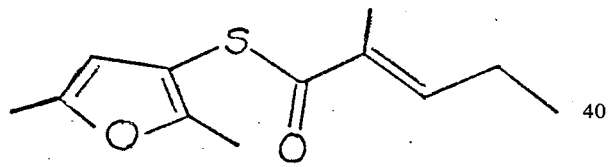

Mass Spectral Analysis:
  Molecular Ion, then decreasing intensity: 224, 97, 41, 43, 69, 39, 127

NMR Analysis (CDCl$_3$):

| Signal | Interpretation |
| --- | --- |
| 1.06 (t,3) | CH$_2$—C$\underline{H}_3$ |
| 1.92 (s,3) | ![CH3 group on C=C with C=O] |
| 2.17 (s,3) | |
| 2.22 (s,3) | |
| 2.20 (m,2) | [furan-S-C(O)-CH=C(CH3)-CH2-CH3 structure] |
| 5.84 (s,1) | [furan H] |
| 6.87 (t,1) ppm | =C$\underline{H}$—CH$_2$ |

EXAMPLE XXVI

PREPARATION OF 2-METHYL-3-THIOPIVALOYL FURAN

Into a 25 ml, three-neck reaction flask equpped with reflux condenser, calcium chloride drying tube, magnetic stirrer and addition funnel, the following materials are added:

| (i) | 2-methyl-3-furanthiol | 1.14g(0.01 moles) |
| (ii) | Diethyl ether | 10 ml |

The contents of the flask are stirred for a period of 5 minutes at which time 0.79 g (0.01 moles) of dry, distilled pyridine is added. After the completion of the pyridine addition, 1.20 g (0.01 moles) of pivaloyl chloride is added, dropwise, from the addition funnel, over a period of one minute. At that point a pyridine hydrochloride precipitate is formed. The reaction mass is then stirred for a period of 45 minutes after which time it is heated to reflux (37°C) for a period of 1 hour. At the end of this time, GLC analysis indicates that the reaction is 80% complete. The reaction mass consists of a solid and liquid. The solid is removed by vacuum filtration, and the filtrate is concentrated in vacuo into a pale-yellow liquid weighing 1.5 g. The major material is trapped using GLC and analyzed using mass spectral, NMR and IR analyses to be 2-methyl-3-thiol-pivaloyl furan having the structure:

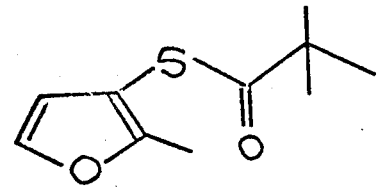

Mass Spectral Analysis:
  Molecular Ion, then in decreasing intensity: 198, 57, 114, 41, 29, 85, 39

NMR Analysis (CDCl$_3$):

| Signal | Interpretation |
| --- | --- |
| 1.27 (s,9) | —C(CH$_3$)$_3$ |
| 2.19 (s,3) | —C$\underline{H}_3$ |
| 6.25 (d,1) | $\underline{H}$ [furan] |
| 7.30 (d,1) ppm | $\underline{H}$ [furan] |

EXAMPLE XXVII

PREPARATION OF 2,5-DIMETHYL-3-THIOPIVALOYL FURAN

Into a 25 ml, three-neck reaction flask equipped with reflux condenser, calcium chloride drying tube, magnetic stirrer and addition funnel, the following materials are charged:

| | | |
|---|---|---|
| (i) | 2,5-Dimethyl-3-furanthiol | 1.28 g (0.01 moles) |
| (ii) | Diethyl ether | 10 ml |

The contents of the flask are stirred for four minutes after which time 0.79 g of pyridine (0.01 moles) is added. After the pyridine addition, 1.20 g (0.01 moles) of pivaloyl chloride is added, dropwise, from the addition funnel, over a period of one minute. The reaction mass is then heated to reflux and maintained at reflux for a period of 1 hour (37°C) after which time the reaction mass is concentrated to an orange liquid weighing 2.5 g. The major component is isolated by GLC.

NMR, IR and mass spectral analyses yield the information that the resultant product is 2,5-dimethyl-3-thiopivaloyl furan, having the structure:

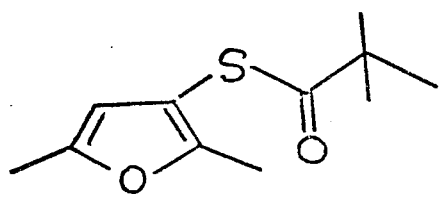

Mass Spectral Analysis:
Molecular Ion, then in decreasing intensity: 212, 57, 128, 43, 212, 41, 127

| NMR Analysis: (CDCl₃) | |
|---|---|
| Signal | Interpretation |
| 1.26 (s,9) | CH₃<br>\|<br>—C—CH₃<br>\|<br>CH₃ |
| 2.15 (s,3)<br>2.22 (s,3) | 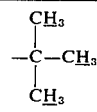 |
| 5.84 (s,1) ppm | 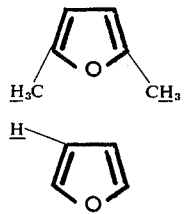 |

EXAMPLE XXVIII

PREPARATION OF 2,5-DIMETHYL-3-THIOHEXANOYL FURAN

Into a 100 ml, three-neck reaction flask equipped with reflux condenser, thermometer, magnetic stirrer and calcium chloride drying tube, the following materials are added:

| | | |
|---|---|---|
| (i) | 2,5-Dimethyl-3-furanthiol | 3.84 g (0.03 moles) |
| (ii) | Diethyl ether (anhydrous) | 30 ml |

The contents of the flask are stirred for five minutes, after which time 2.37 g (0.03 moles) of pyridine is added. After the pyridine addition, 4.02 g (0.03 moles) of hexanoyl chloride is added, dropwise, over a period of 2 minutes. The reaction mass refluxes during the addition of the hexanoyl chloride. After the addition is complete, the reaction mass is stirred for a period of 1 hour at about 38°C. At the end of the one hour period, GLC analysis indicates that the reaction is virtually complete. The solid pyridine hydrochloride product is removed by suction filtration and the resulting filtrate is concentrated in vacuo to a reddish-orange liquid weighing 5.0 g. The major material present is isolated using GLC.

Mass Spectral, IR and NMR analyses yield the information that this material is 2,5-dimethyl-3-thiohexanoyl furan having the structure:

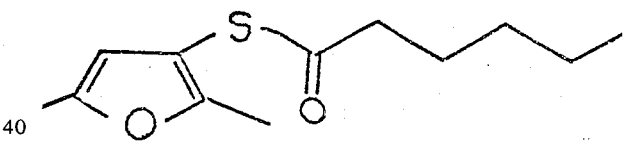

Mass Spectral Analysis:
Molecular Ion, then in decreasing intensity: 226, 43, 128, 71, 99, 127, 41, 39, 226

| NMR Analysis (CDCl₃): | |
|---|---|
| Signal | Interpretation |
| 0.88 (t,3) | —CH₂CH₃ |
| 1.32 (m,4) | —CH₂CH₂—CH₂—CH₃ |
| 1.66 (m,2) | O<br>\|\|<br>—C—CH₂—CH₂—CH₂— |
| 2.16 (s,3)<br>2.21 (s,3) | H₃C—furan—CH₃ |
| 2.56 (t,2) | O<br>\|\|<br>—C—CH₂—CH₂— |
| 5.84 (s,1) ppm | H on furan ring |

EXAMPLE XXIX

PREPARATION OF 2-PROPYL-3-THIOACETYL FURAN

A. PREPARATION OF 2-PROPYL-2,5-DIMETHOYY-2,5-DIHYDRO FURAN FROM 2-PROPYL FURAN

Reaction

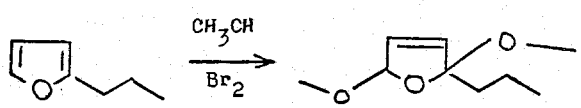

Into a 500 ml three-necked reaction flask equipped with mechanical stirrer, calcium carbonate drying tube and thermometer, the following materials are placed:

| (i) | 2-Propyl furan | 25.0 g (0.227 moles) |
|---|---|---|
| (ii) | Methanol, absolute | 180 ml |
| (iii) | Sodium carbonate | 47.1 g (0.454 moles) |

The reaction mass is cooled to −10°C using a dry-ice acetone bath. Over a period of 20 minutes, a solution of 36.3 grams of bromine in 70 ml absolute methanol is added dropwise while maintaining the reaction mass at −12°C to −13°C. After the addition of the bromine solution, the reaction mass is stirred for 1.5 hours while maintaining same at −10°C.

The reaction mass is then mixed with 450 ml of saturated sodium chloride solution. The resulting mixture is suction filtered and the filter cake is washed with 100 ml of methylene dichloride. The resultant filtrate and washings are placed in a separatory funnel and the lower organic phase is drawn off. The aqueous phase is extracted with two 100 ml portions of methylene dichloride and the organic solutions are combined. The organic solution is then dried over anhydrous sodium sulfate and filtered; and then concentrated in vacuo to a yellow liquid weighing 32.7 grams. The major peak of this material determined by GLC contains 2-propyl-2,5-dimethoxy-2,5-dihydro furan (GLC conditions: F & M 5750; 8 feet × ¼ inch; SE-30; 130° – 225°C per min., flow rate - 80 ml/minute, chart speed 0.25 inches per minute).

B. PREPARATION OF 4-OXO-2-HEPTENAL

Reaction

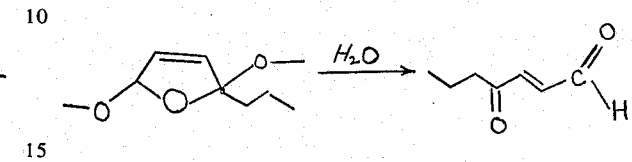

Into a 250 ml three-necked reaction flask equipped with mechanical stirrer and thermometer the following materials are added;

| (i) | 2-Propyl-2,5-dimethoxy 2,5-dihydrofuran prepared according to the process of Part A | 32.7 g (0.16 moles) |
|---|---|---|
| (ii) | Water (distilled) | 325 ml |

The reaction mass is stirred for a period of 4 hours at 24°C. At the end of this period of time, the reaction mass exists in two phases: an aqueous upper phase, and an organic lower phase. The aqueous upper phase is decanted and placed in a one liter vessel for the following reaction C.

C. REACTION OF 4-OXO-HEPTENAL WITH THIOACETIC ACID

Reaction

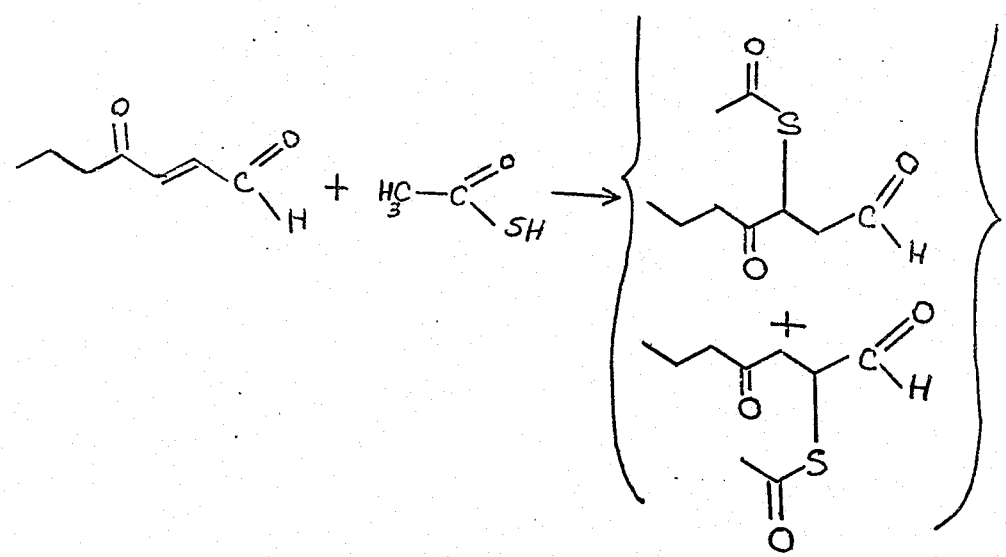

To the stirred aqueous solution produced in Part B, supra, of 4-oxo-2-heptenal is added 0.4 ml piperidine. After the piperidine addition, 12.4 grams of thioacetic acid is added to the reaction mass over a period of 4 minutes while maintaining the reaction mass at a temperature in the range of 27°–32°C. After the thioacetic acid addition is complete, the reaction mass is stirred for 1.5 hours. The reaction mass is then placed in a separatory funnel and extracted with 100 ml of methylene dichloride. The methylene dichloride solution is then separated, dried over anhydrous sodium sulfate and concentrated to an orange oil weighing 23.8 grams. This orange oil is analyzed using GLC and determined to contain two isomers having the above structures.

Mass Spectral Analysis of Trap I:
  Molecular Ion, then in decreasing intensity: 202, 43, 28, 71, 55, 41, 97, 83 m/e Mass Spectral Analysis of Trap II:
  Molecular Ion, then in decreasing intensity: 202, 28, 43, 71, 99 m/e

D. PREPARATION OF 2-PROPYL-3-THIOACETYL FURAN

Reaction

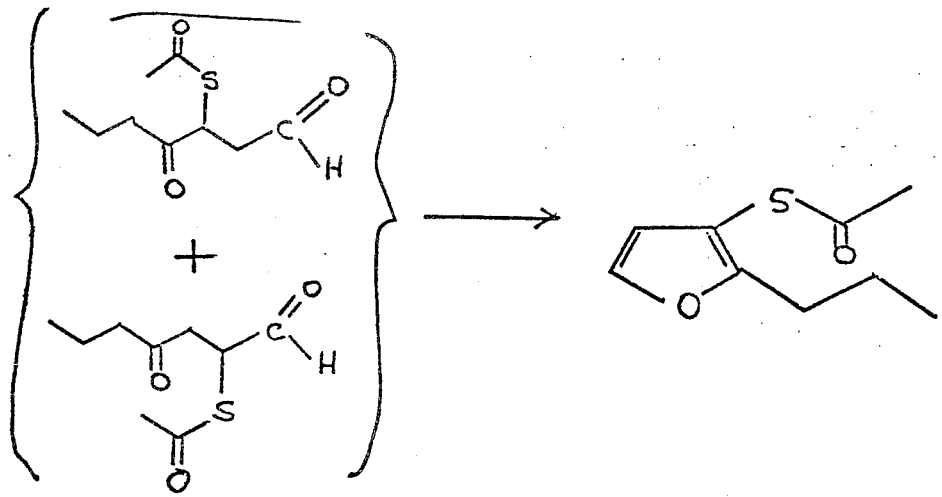

Into a 500 ml flask, equipped with reflux condenser, calcium chloride drying tube, mechanical stirrer, thermometer and addition funnel, the following materials are placed:

(i) Isopropenyl acetate 175 ml
(ii) Concentrated sulfuric acid 0.5 ml

The mass is heated to reflux (93°C) and, over a period of 20 minutes, while maintaining the reaction mass temperature at 91°–93°C, a solution of 23.0 grams of the reaction product of Part C in 25 ml of isopropenyl acetate is added from the addition funnel to the reaction mass with stirring. The reaction mass is then stirred and maintained at 91°C for a period of 30 minutes at which point 5.0 grams of sodium bicarbonate is added to the mass.

The isopropenyl acetate cyclization agent is then distilled off at a pot temperature of 80°C and a head temperature of 50°C at 60 mm Hg pressure. The resulting residue is admixed with 50 ml benzene and 50 ml water. The resulting mixture is placed into a separatory funnel and the layers are separated. The benzene layer is filtered through anhydrous sodium sulfate and is then concentrated in vacuo to a brown liquid weighing 5.0 grams. This liquid is distilled through a short path microdistillation apparatus at 100°–103°C and 0.3 mm Hg pressure, yielding 2-propyl-3-thioacetyl furan as confirmed by mass spectral and NMR analysis.

Mass Spectral Analysis:
  Molecular ion, then in decreasing intensity: 184, 113, 43, 142, 27, 184

NMR Analysis (CDCl₃)

| Signal | Interpretation |
|---|---|
| δ 1.01 (t,3) | CH₂CH₃ |
| 1.65 (m,2) | CH₂CH₂CH₃ |
| 2.36 (s,3) |  |
| 2.59 (t,2) |  |
| 6.32 (d,1) | |
| 7.35 ppm (d,1) | 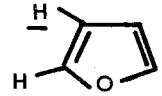 |

EXAMPLE XXX

PREPARATION OF 2-METHYL-3-THIOSOBUTYRYL FURAN

A mixture of 1.0 g of 2-methyl-3-furanthiol, 0.70 g of pyridine and 10 ml of diethyl ether is placed in a flask and 0.93 g of isobutyryl chloride is added. After standing 30 minutes, the resulting mixture is filtered and the filtrate concentrated in vacuo to a greenish yellow oil weighing 1.0 g. The product is isolated by preparative GLC. NMR, IR and mass spectral analysis confirmed the structure of the product as 2-methyl-3-thioisobutyryl furan.

Mass Spectrum:
  Parent Ion, then decreasing intensity: 184, 71, 43, 41, 114, 113 m/e NMR Spectrum (CDCl₃):
  7.31 (d,1), 6.20 (d,1), 2.83 (m,1), 2.21 (s,3) and 1.23 (d,6) ppm.

What is claimed is:

1. A process for producing a 3-thia furan compound comprising the steps of:
  i. Intimately admixing at a temperature of from 0°C to reflux temperature and autogenous pressure a 2-ene-1,4-dione having the structure:

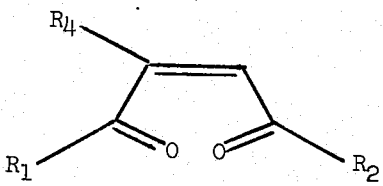

with a thiol having the formula $R_3SH$ thereby providing a substituted or unsubstituted 2-thia substituted-1,4-dione having the structure:

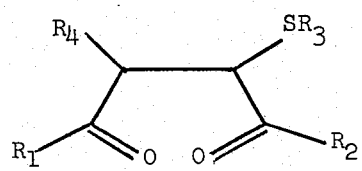

wherein $R_3$ is selected from the group consisting of alkyl, alkanoyl and aroyl; wherein $R_2$ is lower alkyl; and wherein $R_1$ and $R_4$ are the same or different and are selected from the group consisting of hydrogen and lower alkyl; wherein when $R_1$ is hydrogen, the reaction (i) is carried out in the presence of an organic base selected from the group consisting of secondary amines and tertiary amines; and wherein when $R_1$ is lower alkyl, the reaction (i) is carried out in the presence or absence of said organic base; and ii. Cyclizing said 2-thia substituted-1,4-dione at a temperature of from 25°C up to reflux temperature and autogenous pressure, with a cyclizing agent comprising:
  a. A first compound selected from the group consisting of sulfuric acid, hydrochloric acid, zinc chloride, boron trifluoride, boron trifluoride etherates, aluminum trichloride, para toluene sulfonic acid and boron trichloride; and
  b. A second compound selected from the group consisting of acetic anhydride, propionic anhydride and isopropenyl acetate;

the weight ratio of said first compound to said second compound being from 0.001 up to 0.05, and the weight ratio of said second compound to said 2-thiasubstituted-1,4-dione being from 4:1 up to 5:1, to form a substituted or unsubstituted 3-thia furan having the formula:

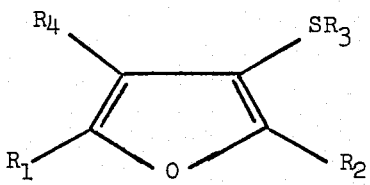

2. The process of claim 1 wherein $R_1$ is hydrogen and the reaction (i) is carried out in the presence of an organic base selected from the group consisting of secondary amines and tertiary amines.

3. The process of claim 2 wherein the organic base is selected from the group consisting of piperidine, pyridine, triethyl amine, quinoline and 2-picoline.

4. The process of claim 1 wherein $R_2$ and $R_2$ are each methyl.

5. The process of claim 4 wherein $R_4$ is hydrogen.

6. The process of claim 4 wherein $R_4$ is hydrogen, and $R_3$ is selected from the group consisting of benzoyl and acetyl.

7. A process for producing 3-furan thiols having the structure:

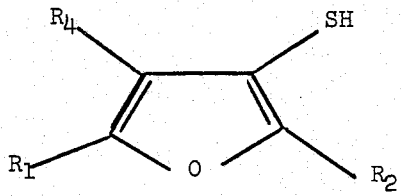

comprising the steps of:
i. Intimately admixing at a temperature of from 0°C to reflux temperature and autogenous pressure a 2-ene-1,4-dione having the structure:

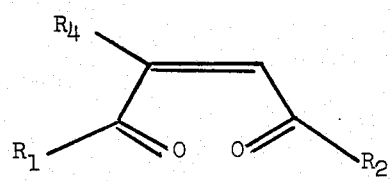

with a thiol having the formula $R_3SH$ thereby providing a substituted or unsubstituted 2-thia substituted-1,4-dione having the structure:

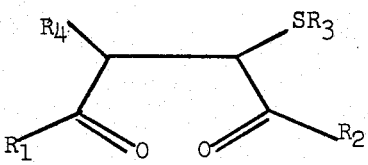

wherein $R_3$ is selected from the group consisting of alkanoyl and aroyl, wherein $R_2$ is lower alkyl; and wherein $R_1$ and $R_4$ are the same or different and are selected from the group consisting of hydrogen and lower alkyl; wherein when $R_1$ is hydrogen, the reaction (i) is carried out in the presence of an organic base selected from the group consisting of secondary amines and tertiary amines; and wherein when $R_1$ is lower alkyl, the reaction (i) is carried out in the presence of or in the absence of said organic base; and ii. Cyclizing said 2-thia substituted-1,4-dione at a temperature of from 25°C up to reflux temperature at autogenous pressure with a cyclizing agent comprising:
  a. A first compound selected from the group consisting of sulfuric acid, hydrochloric acid, zinc chloride, boron trifluoride, boron trifluoride etherates, aluminum trichloride, para toluene sulfonic acid and boron trichloride; and
  b. A second compound selected from the group consisting of acetic anhydride, propionic anhydride and isopropenyl acetate;

the weight ratio of said first compound to said second compound being from 0.001 up to 0.05, and the weight ratio of said second compound to said 2-thiasubstituted-1,4-dione being from 4:1 up to 5:1, to form a substituted or unsubstituted 3-alkanoyl thiafuran or 3-aroyl thia furan having the formula:

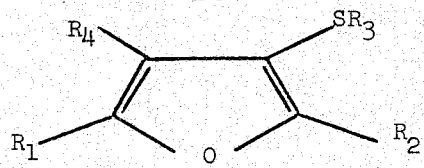

and iii. Hydrolyzing said 3-alkanoyl thia furan or 3-aroyl thia furan by:
   a. First admixing dilute alkali metal hydroxide with the alkanoyl thiafuran or aroyl thiafuran thereby forming an alkali metal thiafuran wherein the equivalent ratio of alkali metal hydroxide to alkanoyl thiafuran or aroyl thiafuran is at least 1:1; and then
   b. Admixing the resulting alkali metal thiafuran with dilute acid, thereby forming a 3-mercapto furan having the structure:

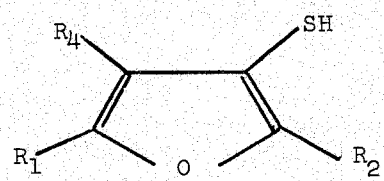

8. The process of claim 1 wherein the cyclizing agent is a mixture of concentrated sulfuric acid and isopropenyl acetate, the ratio of sulfuric acid to isopropenyl acetate being from 0.001 up to 0.05.

9. The process of claim 2 wherein the cyclizing agent is a mixture of concentrated sulfuric acid and isopropenyl acetate, the ratio of sulfuric acid to isopropenyl acetate being from 0.001 up to 0.05.

10. The process of claim 8 wherein the cyclizing agent is a mixture of concentrated sulfuric acid and isopropenyl acetate, the ratio of sulfuric acid to isopropenyl acetate being from 0.001 up to 0.05.

11. The process of claim 1 wherein the cyclizing agent is selected from the group consisting of:
   i. A mixture of concentrated sulfuric acid and isopropenyl acetate, the ratio of sulfuric acid to isopropenyl acetate being from 0.001 to 0.05; and
   ii. A mixture of concentrated sulfuric acid and acetic anhydride, the ratio of sulfuric acid to acetic anhydride being from 0.001 up to 0.05.

12. The process of claim 1 wherein the cyclizing agent is a mixture of isopropenyl acetate and sulfuric acid and the mole ratio of isopropenyl acetate to 2-thiasubstituted-1,4-dione is at least 1:1, and the weight ratio of sulfuric acid to isopropenyl acetate is from 0.001 up to 0.05.

13. The process of claim 7 comprising the additional step of (iv) reacting the resulting 3-mercapto furan with a compound selected from the group consisting of an alkanoyl halide and an aroyl halide in the presence of an inert solvent and an organic base.

* * * * *